(12) United States Patent
Michael

(10) Patent No.: US 7,121,356 B2
(45) Date of Patent: Oct. 17, 2006

(54) TOOLS AND METHODS FOR RETRIEVING BURIED COINS AND OTHER TREASURE

(76) Inventor: Kenneth E. Michael, 5800 Hamilton Ave., Baltimore, MD (US) 21237

(*) Notice: Subject to any disclaimer, the term of this patent is extended or adjusted under 35 U.S.C. 154(b) by 0 days.

(21) Appl. No.: 10/858,604

(22) Filed: Jun. 2, 2004

(65) Prior Publication Data

US 2005/0269112 A1   Dec. 8, 2005

(51) Int. Cl.
*A01B 35/16* (2006.01)
(52) U.S. Cl. .................. 172/371; 175/252; 172/19
(58) Field of Classification Search ............. 172/19, 172/21, 22, 25, 37, 41, 371, 378, 381; 175/20, 175/58, 248, 249, 250, 251, 252
See application file for complete search history.

(56) References Cited

U.S. PATENT DOCUMENTS

| | | | |
|---|---|---|---|
| 797,622 A * | 8/1905 | Smith ...................... 175/240 |
| 971,257 A | 9/1910 | Dube | |
| 1,044,303 A | 11/1912 | Unsinger | |
| 1,257,179 A | 2/1918 | Berst | |
| 1,357,508 A * | 11/1920 | McGregor ............... 294/86.11 |
| 1,611,831 A * | 12/1926 | Gates ...................... 175/249 |
| 1,816,991 A * | 8/1931 | Amburgh et al. ......... 175/252 |
| 1,861,363 A | 5/1932 | Scheuner | |
| 1,866,073 A * | 7/1932 | Aberle ...................... 172/13 |
| 2,030,770 A | 2/1936 | Smith ........................ 55/65 |
| 2,050,439 A | 8/1936 | Marx .......................... 30/9 |
| 2,082,476 A * | 6/1937 | Allen ........................ 172/25 |
| 2,662,395 A * | 12/1953 | Brazier ...................... 73/38 |
| 2,709,617 A * | 5/1955 | Lang ..................... 294/86.11 |
| 2,728,599 A * | 12/1955 | Moore .................... 294/86.11 |
| 2,746,147 A | 5/1956 | Booth ...................... 30/339 |
| 3,047,081 A * | 7/1962 | Pitcher .................... 175/239 |
| 3,198,719 A * | 8/1965 | Stewart .................... 294/50.5 |
| 3,273,930 A | 9/1966 | Gottfried ................. 294/50.5 |
| 3,444,938 A * | 5/1969 | Ballmann ................. 111/101 |
| 3,488,843 A | 1/1970 | Tims, Jr. .................... 30/162 |
| 3,707,197 A | 12/1972 | Walesch et al. ............ 175/20 |
| 3,807,234 A * | 4/1974 | Duperon .................. 175/248 |
| 3,865,055 A | 2/1975 | Gilbaugh ................... 111/4 |
| 4,180,909 A | 1/1980 | Lind ........................ 30/332 |
| 4,653,790 A * | 3/1987 | Kenney ..................... 294/50 |
| 4,907,659 A * | 3/1990 | Ludwig ..................... 175/20 |

(Continued)

*Primary Examiner*—Thomas B. Will
*Assistant Examiner*—Toni Newville
(74) *Attorney, Agent, or Firm*—Armstrong, Kratz, Quintos, Hanson & Brooks, LLP

(57) ABSTRACT

A "sod saver" tool for digging to acquire an object buried in the ground, and a non-metallic scraping tool utilized when carefully examining the soil. The sod saver tool includes a main cylindrical body rotated about its longitudinal axis for digging a substantially cylindrical plug of soil from the ground, the object being contained in the plug of soil, and a plurality of circumferentially-disposed resilient non-metallic fingers located at a bottom portion of the main cylindrical body. When the digging of the plug is being performed, the resilient fingers tend to spread radially outward from the longitudinal axis of the main cylindrical body, being deflected away from directly hitting and scratching the buried object, tend to generally direct the soil upwardly into the main cylindrical body, and tend to cause the plug to be substantially-compacted and cylindrical. The compacted plug may be easily reinserted into a hole in the ground. The sod saver tool also includes a rod with markings for setting a digging level, with a retractable cutting tool with teeth attached to the rod.

7 Claims, 10 Drawing Sheets

U.S. PATENT DOCUMENTS

| | | | |
|---|---|---|---|
| 4,951,584 A * | 8/1990 | Pearce | 111/101 |
| 4,974,682 A | 12/1990 | Hoffman | 172/22 |
| 5,207,466 A * | 5/1993 | Ohlson | 294/61 |
| 5,211,249 A * | 5/1993 | Richter et al. | 175/20 |
| 5,242,024 A * | 9/1993 | Van Houten | 172/19 |
| 5,245,878 A | 9/1993 | Underwood | 73/864.44 |
| 5,338,078 A * | 8/1994 | Basek | 294/50.5 |
| 5,398,624 A | 3/1995 | Caron | 111/106 |
| 5,469,923 A * | 11/1995 | Visser | 172/22 |
| 5,492,181 A | 2/1996 | Grant | 172/22 |
| 5,501,283 A | 3/1996 | Nordquist | 172/22 |
| 5,662,179 A | 9/1997 | Falk | 175/20 |
| 6,123,374 A * | 9/2000 | Elder | 294/50 |
| 6,125,948 A * | 10/2000 | David et al. | 175/58 |
| 6,374,758 B1 | 4/2002 | Mickle et al. | 111/106 |
| 6,386,294 B1 | 5/2002 | Best | 172/22 |
| 6,505,693 B1 * | 1/2003 | Looijen et al. | 175/249 |
| D486,374 S | 2/2004 | Knoop | D8/99 |
| 2002/0144409 A1 | 10/2002 | Chen | 30/299 |
| 2003/0205408 A1 * | 11/2003 | Lee et al. | 175/20 |

\* cited by examiner

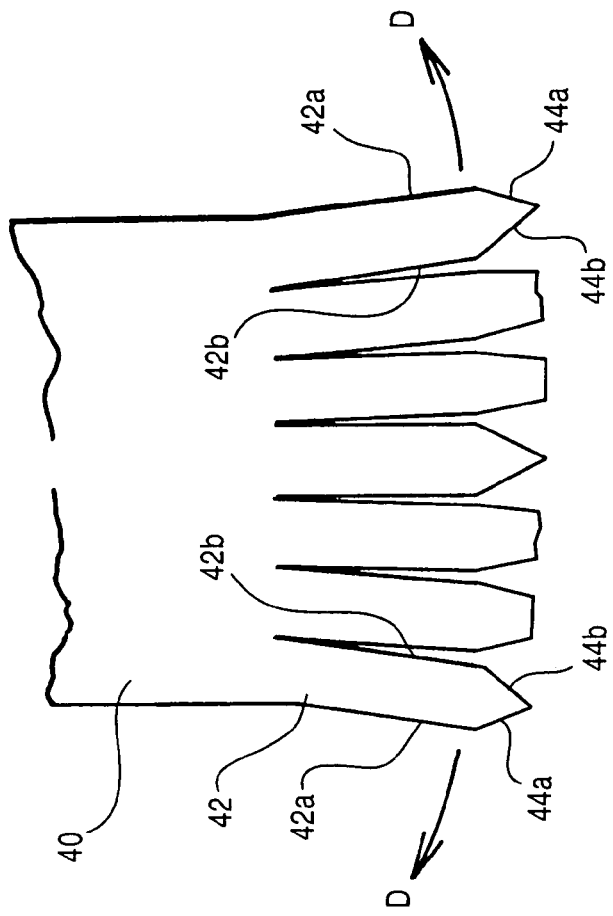
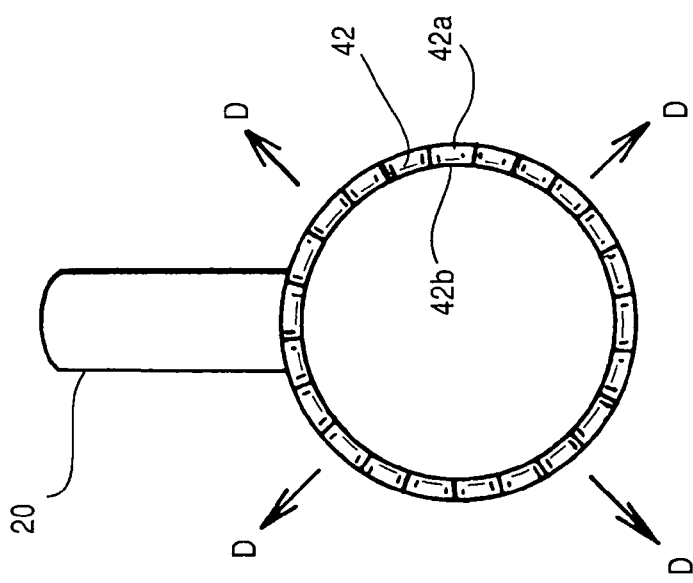

$\theta_1 > \theta_2$

FIG.8
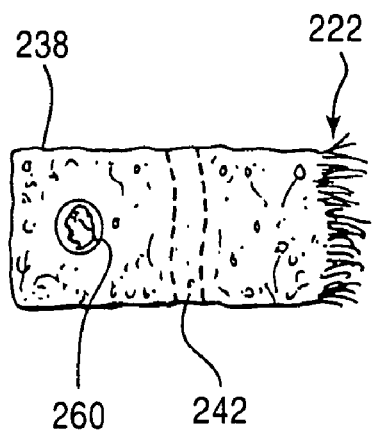
FIG.9A
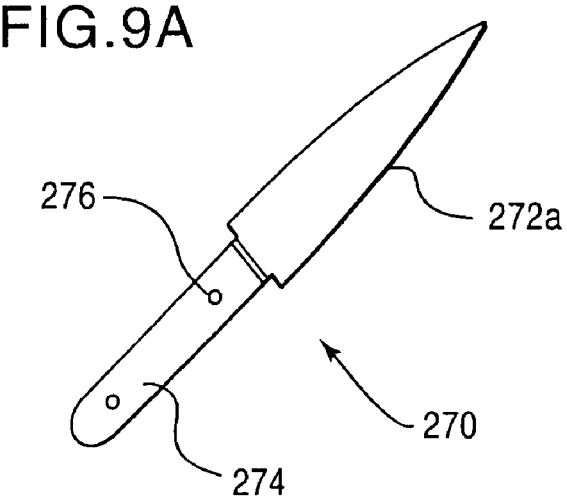
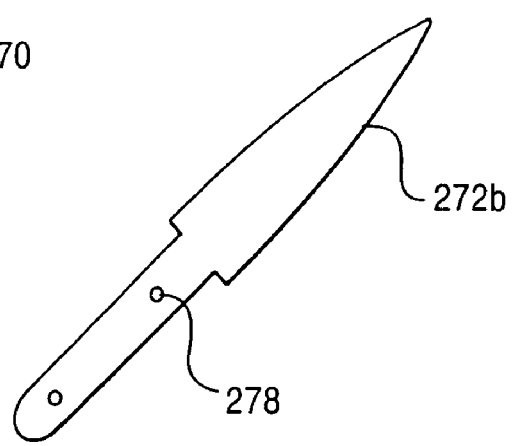
FIG.9B

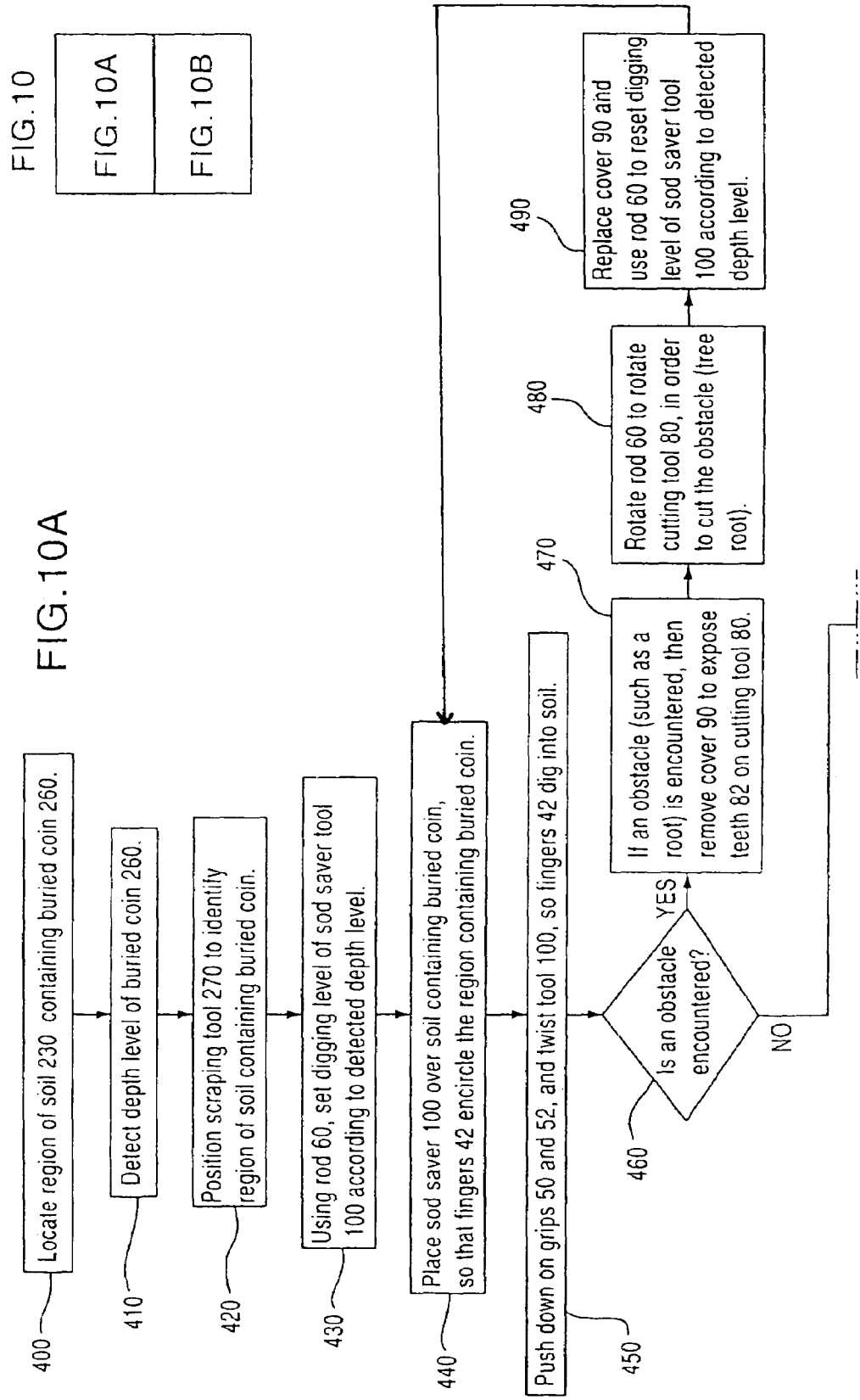

TOOLS AND METHODS FOR RETRIEVING BURIED COINS AND OTHER TREASURE

BACKGROUND OF THE INVENTION

1. Technical Field

The present invention relates to retrieving objects detected by a metal detector, and more particularly relates to digging tools and methods used to retrieve metallic objects such as buried coins and other treasure.

2. Related Art

The hobby of metal detecting involves detecting a buried metallic object using a metal detector, and then digging into the soil to retrieve the object.

A variety of digging-related devices or cutting-related devices have been developed, some of which are disclosed in the following first group of references: U.S. Pat. No. D486,374 for Knife For Replaceable Blades, issued to Knoop on Feb. 10, 2004; U.S. Pat. No. 971,257 for Razor Blade Holder, issued to Dube on Sep. 27, 1910; U.S. Pat. No. 1,044,303 for Knife, issued to Unsinger on Nov. 12, 1912; U.S. Pat. No. 1,257,179 for Razor Blade Holder, issued to Berst on Feb. 19, 1918; U.S. Pat. No. 1,861,363 for Quick Detachable Handle For Tools, issued to Scheuner on May 31, 1932; U.S. Pat. No. 2,030,770 for Weed Puller, issued to Smith on Feb. 11, 1936; U.S. Pat. No. 2,050,439 for Utility Cutter Tool, issued to Marx on Aug. 11, 1936; U.S. Pat. No. 2,746,147 for Utility Knife, issued to Booth on May 22, 1956; and U.S. Pat. No. 3,273,930 for Soil-Extracting Implements, issued to Gottfried on Sep. 20, 1966.

Additional digging-related devices or cutting-related devices are disclosed in the following second group of references: U.S. Pat. No. 3,444,938 for Ground Soil Coring Implement, issued to Ballmann on May 20, 1969; U.S. Pat. No. 3,488,843 for Hand Cutting Tool With Means To Support A Plurality Of Blades And Means To Hold A Single Blade In A Cutting Position, issued to Tims, Jr. on Jan. 13, 1970; U.S. Pat. No. 3,707,197 for Ground Core Removing Tool, issued to Walesch et al. on Dec. 26, 1972; U.S. Pat. No. 3,865,055 for Plant Transplanter, issued to Gilbaugh on Feb. 11, 1975; U.S. Pat. No. 4,180,909 for Knife With Exchangeable Blades, issued to Lind on Jan. 1, 1980; and U.S. Pat. No. 4,974,682 for Hammer Driven Soil Coring Device, issued to Hoffman on Dec. 4, 1990.

Other digging-related devices or cutting-related devices are disclosed in the following third group of references: U.S. Pat. No. 5,245,878 for Vegetation Maintenance System, issued to Underwood on Sep. 21, 1993; U.S. Pat. No. 5,398,624 for Transplanting Tool, issued to Caron on Mar. 21, 1995; U.S. Pat. No. 5,492,181 for Apparatus For Cutting Square Grass Plugs, issued to Grant on Feb. 20, 1996; U.S. Pat. No. 5,501,283 for Hole Cutting Device For Recovering Targets Located With A Metal Detector, issued to Nordquist on Mar. 26, 1996; U.S. Pat. No. 5,662,179 for Hole-Making Device, issued to Falk on Sep. 2, 1997; U.S. Pat. No. 6,374,758 for Manually Manipulated Rotatable Digging Blade, issued to Mickle et al. on Apr. 23, 2002; U.S. Pat. No. 6,386,294 for Hole Making System, issued to Best on May 14, 2002; and U.S. Patent Publication No. US 2002/0144409 for Versatile Survival Knife, issued to Chen on Oct. 10, 2002.

The references listed above may provide a variety of advantages. However, in view of the foregoing, I believe that there is still a need for new tools and methods which allow a person to dig a buried object out from the ground without scratching, damaging, or marring the object.

Accordingly, further improvements in tools and methods for retrieving buried coins and other treasures can be envisioned.

SUMMARY OF THE INVENTION

In accordance with the principles of the present invention, the present invention provides convenient and elegant tools and methods which allow a person to dig a buried object out from the ground without scratching, damaging, or marring the object.

The present invention provides a "sod saver" tool for digging into soil, in accordance with the principles of the present invention. The sod saver tool is generally used after a metallic object is detected with a metal detector. For example, if a small metal object is detected to be in the ground, the sod saver tool is utilized to dig a cylinder-shaped hole in the ground and then carefully remove a cylinder-shaped plug of soil from the hole. The small metal object will be contained within the plug of soil.

Additionally, the present invention provides a scraping tool for scraping some soil away from the cylinder-shaped plug of soil, and for scraping soil away from the small metal object, in accordance with the principles of the present invention. Thus, after the sod saver tool is utilized to remove the plug of soil from the hole, the scraping tool is utilized to help a person to carefully analyze the contents of the plug of soil, so that the small metal object can be located and acquired. The scraping tool is formed from materials including non-metallic materials.

In accordance with the principles of the present invention, the present invention provides convenient and elegant methods for retrieving buried treasure without damaging the buried treasure.

In accordance with the principles of the present invention, the sod saver tool of the present invention includes a plurality of resilient fingers that can flex when digging the cylinder-shaped hole in the ground. The resilient fingers of the sod saver of the present invention provide multiple advantages, including the advantages described below.

The fingers of the sod saver tool include a non-metallic material which helps to prevent the buried treasure from being scratched or damaged if the fingers inadvertently come into contact with the buried treasure. The non-metallic material selected to be included in the fingers is a material that is not likely to scratch or damage the buried treasure if it ever comes into contact with the buried treasure.

When a user inadvertently directs a metal detector toward a large solid metal object, such as a metal shovel, the user may experience discomfort due to the loud noise produced by the metal detector. In accordance with the principles of the present invention, the non-metallic material selected to be included in the fingers of the sod saver tool helps to prevent such loud noise and discomfort. Even if the metal detector is directed inadvertently toward the fingers of the sod saver tool, the metal detector should not produce loud noise, because the fingers include non-metallic material.

The fact that the fingers of the sod saver tool can resiliently flex is beneficial because this helps to avoid a direct impact with the buried treasure which could damage the buried treasure. When the fingers of the sod saver tool come into contact with a rigid, solid object, the fingers can flex outward, away from the object. Thus, damage to the buried treasure can be avoided.

The fact that the fingers of the sod saver tool can resiliently flex is also beneficial because this helps to guide the soil up into the body of the sod saver tool. Additionally, the resilient flexing of the fingers helps to hold the cylinder-shaped plug of soil in the body of the sod saver tool when the sod saver tool is pulled up out of the hole.

The sod saver tool can dig into sod, that is, a section of grass-covered surface soil held together by matted roots, and can help to prevent damage to the sod. The sod saver tool also helps prevent the buried treasure from being damaged.

In accordance with the principles of the present invention, as embodied and broadly described, the present invention provides a tool for digging to acquire a coin, treasure, or other object buried in the ground, the object being located by a metal detector, the tool comprising: a main cylindrical body rotated about its longitudinal axis for digging a substantially cylindrical plug of soil from the ground, the object being contained in the plug of soil; and a plurality of circumferentially-disposed resilient fingers located at a bottom portion of the main cylindrical body; wherein when the digging of the plug is being performed, the resilient fingers tend to spread radially of the longitudinal axis of the main cylindrical body, being deflected away from directly hitting and scratching and marring the buried object, tend to generally direct the soil upwardly into the main cylindrical body, and tend to cause the plug to be substantially-compacted and cylindrical, wherein the compacted plug may be easily reinserted into a hole in the ground.

In accordance with the principles of the present invention, as embodied and broadly described, the present invention provides a tool wherein the resilient fingers are formed of a relatively high-impact smooth plastic material intended to avoid scratching and marring the buried object initially engaged by the resilient fingers.

In accordance with the principles of the present invention, as embodied and broadly described, the present invention provides a tool for digging to acquire a coin or other treasure buried in the ground, the coin or other treasure being located by a metal detector, the tool comprising: a main cylindrical body having a digging portion at a bottom region of the main cylindrical body, the main cylindrical body being rotated about its longitudinal axis for digging a substantially cylindrical plug of soil from the ground, the coin or other treasure being contained in the plug of soil; and an inner plunger slidably received telescopically up within the main cylindrical body and away from the bottom region of the main cylindrical body, the plunger having a lower end provided with cutting teeth, wherein when an underground obstacle is encountered in the soil, the plunger is slidably advanced within the main cylindrical body until the cutting teeth extend beyond the bottom region of the main cylindrical body to cut the underground object, and the inner plunger is rotated about its longitudinal axis to cut through the underground object.

In accordance with the principles of the present invention, as embodied and broadly described, the present invention provides a tool for digging to acquire an object buried in the ground, the tool comprising: a main cylindrical body being rotated about its longitudinal axis for digging a substantially cylindrical plug of soil from the ground, the object being contained in the plug of soil; digging means for digging being formed at a bottom region of the main cylindrical body, the digging means being resilient, wherein when the digging means encounters the buried object, the digging means will deflect away from the buried object to avoid damaging the buried object; and cutting means telescopically received within the main cylindrical body, the cutting means being selectively advanced beyond the main cylindrical body to cut an obstacle encountered by the main cylindrical body.

In accordance with the principles of the present invention, as embodied and broadly described, the present invention provides a combination of tools for digging out a buried coin or other treasure located by a metal detector, the combination of tools comprising: a main cylindrical body being rotated about its longitudinal axis to dig a substantially cylindrical plug of soil out from the earth, with the buried coin or other treasure being contained in the plug of soil; and a scraping tool for sequentially slicing off successive axial portions of the plug of soil, facilitating a determination by a metal detector as to which axial portion of the plug contains the buried coin or other treasure, the scraping tool including non-metallic material.

In accordance with the principles of the present invention, as embodied and broadly described, the present invention provides a method of digging a hole in soil to acquire an object without scratching the object, the method comprising: setting a digging level of a digging tool according to a detected amount of the soil covering the object, the setting being performed by sliding a rod through a main body of the digging tool to a first position corresponding to the detected amount, wherein a cutting tool is secured to an end of the rod; arranging the digging tool so that a plurality of fingers of the digging tool encircle a surface of the soil covering the object, the fingers being flexible and non-metallic; pushing the digging tool down toward the soil, and rotating the digging tool around an axis substantially parallel to a body of the digging tool, wherein the fingers extend down toward the soil; when the pushing and rotating are performed, digging the fingers through the surface of the soil; when the fingers encounter an obstacle in the soil, arranging the digging tool so that the fingers encircle the soil covering the object, sliding the rod down through the main body of the digging tool toward the fingers to a second position to advance the cutting tool and place the cutting tool in contact with the obstacle, and rotating the rod around the axis substantially parallel to the body of the digging tool to operate the cutting tool to cut through the obstacle; when the cutting tool cuts the obstacle, sliding the rod from the second position to the first position, and arranging the digging tool so that the fingers encircle the soil covering the object; pushing the digging tool toward the soil, and rotating the digging tool around the axis substantially parallel to the body of the digging tool, until the cutting tool contacts the surface of the soil; when the cutting tool contacts the surface of the soil, which indicates that the digging has reached through the predetermined amount of the soil, lifting the digging tool up and automatically holding a quantity of the soil inside the digging tool, wherein the object is contained inside the held soil; incrementally advancing the rod toward the fingers a predetermined distance to push a portion of the held soil out from the digging tool, the incremental advancing being performed by pulling a lever on the digging tool; and separating the soil from the object with a non-metallic scraping tool.

In accordance with the principles of the present invention, as embodied and broadly described, the present invention provides a digging tool for digging a hole in soil to acquire an object without damaging the object, the digging tool comprising: a body having a cylindrical shape, a hollow interior, an open front end, and a wall at a back end; a plurality of fingers at the front end of the body, the fingers being formed of a non-metallic and flexible material, the fingers digging the hole in the soil when the body is pushed down toward the soil and is rotated around an axis of the body; a rod slidably extending through the wall, the rod having a front end and a back end on opposite sides of the wall, the back end of the rod being located outside the body, the back end of the rod having markings corresponding to predetermined digging depths; and a cutting tool having a cylindrical hollow shape, the cutting tool being secured to the front end of the rod, the cutting tool being retracted in the interior of the body when the fingers are digging the hole, wherein when the front end of the rod is pushed toward the open front end of the body to advance the cutting tool to contact soil or an obstacle at the open front end of the body, and the rod is rotated around the axis of the body, the cutting tool cuts through the soil or obstacle.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 2A shows a bottom view of some of the components of the sod saver tool, in accordance with the principles of the present invention;

FIG. 2B shows a side view of the fingers of the sod saver tool, in accordance with the principles of the present invention;

FIG. 8 shows a side view of a cylinder-shaped plug of soil after it has been removed from the ground, in accordance with the principles of the present invention;

FIG. 9A shows the scraping tool, in accordance with the principles of the present invention;

FIG. 9B shows a replacement blade for the scraping tool, in accordance with the principles of the present invention;

FIGS. 10A–10B show a flowchart illustrating a method of using the sod saver tool and the scraping tool, in accordance with the principles of the present invention.

DESCRIPTION OF BEST MODE OF CARRYING OUT THE INVENTION

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
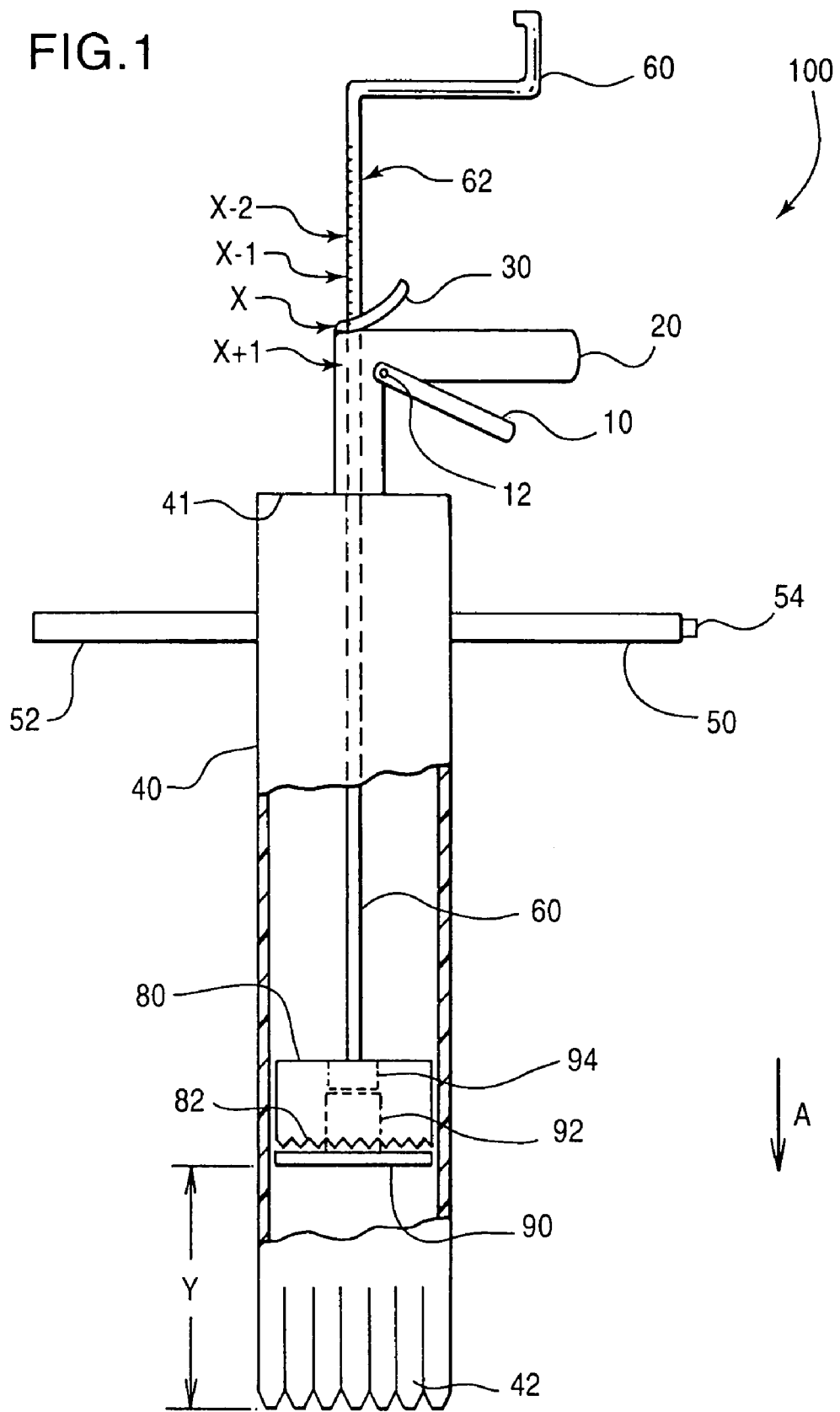
FIG. 1 shows a side view of the sod saver tool, in accordance with the principles of the present invention.

FIG. 1 shows a side view of the "sod saver" tool, in accordance with the principles of the present invention. FIG. 1 depicts the sod saver tool 100 which includes a cylindrical hollow body 40. Fingers 42 are formed at an open end of body 40, and a wall 41 is formed at a closed end of body 40. The sod saver tool 100 also includes rod 60, markings 62 on rod 60, lock unit 30, handle 20, lever 10, hinge 12, first grip 50, second grip 52, magnet 54 on first grip 50, cutting tool 80, teeth 82 on cutting tool 80, magnet 94, magnet 92, and cover 90.

As shown in FIG. 1, the reference symbol "Y" corresponds to an amount of soil that will be held in the body 40 of the sod saver tool 100 after the digging is complete. As shown in FIG. 1, the sod saver tool 100 is pushed in direction "A" when digging down into the ground.

Using a metal detector (not shown), a person can determine whether a metallic object is buried in the soil, and can determine the general vicinity and depth of that object.

In a first example, the depth of a buried object is determined to be five inches below the surface of the soil. After the depth of the buried object is determined, the digging level of the sod saver tool 100 must be set to an appropriate level. When setting the digging level of the tool 100, it is advantageous to add two inches to the determined depth level of the buried object. This extra two inches helps to ensure that the buried object will be included in the plug of soil removed from the ground. Thus, the digging level will be set to be equal to seven inches in this example. Markings 62 are included on rod 60, as shown in FIG. 1. One of the markings 62 corresponds to a digging level of seven inches. In this example, reference symbol "X" is the one marking 62 which corresponds to a digging level of seven inches.

To set the digging level to seven inches, the rod 60 is manipulated to cause the "X" to be aligned with the lock unit 30. As shown in FIG. 1, the rod 60 has been manipulated such that the "X" is aligned with the lock unit 30. Since the "X" here is equal to seven inches, then the sod saver tool has the digging level set to seven inches, as shown in FIG. 1. As shown in FIG. 1, the amount "Y" of soil that will be held in the body 40 of the sod saver tool 100 corresponds to seven inches of soil.

In a second example, the depth of a buried object is determined to be four inches below the surface of the soil. If reference symbol "X" shown in FIG. 1 corresponds to seven inches, then digging level "X−1" corresponds to six inches. Thus, the rod 60 should be manipulated so that the marking 62 corresponding to "X−1" is aligned with lock unit 30. When the rod 60 is manipulated so that the "X−1" is aligned with lock unit 30, then the sod saver tool has the digging level set to six inches.

If reference symbol "X" shown in FIG. 1 corresponds to seven inches, then digging level "X−2" corresponds to five inches and digging level "X+1" corresponds to eight inches. The sod saver tool 100 is formed to be able to conveniently and effectively dig down fifteen inches or more into the ground.

To manipulate rod 60 to set the digging level, the rod 60 can be moved in direction "A" to cause it to proceed further inside body 40, and the rod 60 can be moved in an opposite direction to cause it to move further outside body 40.

As depicted in FIG. 1, the lock unit 30 is locked in order to maintain the position of rod 60. The lock unit 30 is in contact with a spring (not shown) that urges the lock unit 30 into the position shown in FIG. 1, such that most of the lock unit 30 is spaced apart from handle 20.

Manipulation and adjustment of rod 60 is facilitated by unlocking the lock unit 30. To unlock the lock unit 30, the lock unit 30 is pressed in direction "A" toward handle 20. When lock unit 30 is not being pressed toward handle 20, the lock unit 30 is automatically urged by a spring to the position shown in FIG. 1. When the lock unit 30 is in the position shown in FIG. 1, the rod 60 is locked in place, and the rod 60 may be restricted from inadvertently moving in direction "A" and in the direction opposite to direction "A". FIG. 1 shows the sod saver tool 100 when the lock unit 30 is not being pressed, and thus shows rod 60 locked in place and set to digging level X.

An additional way to adjust and manipulate the rod 60 is to pull lever 10 toward handle 20, in the direction opposite to direction "A". When lever 10 is pulled toward handle 20, then the rod 60 is advanced an incremental amount in direction "A". Thus, the lever 10 can be used to adjust the digging level of the sod saver tool 100, by advancing the rod 60 in direction "A".

Figure 11:
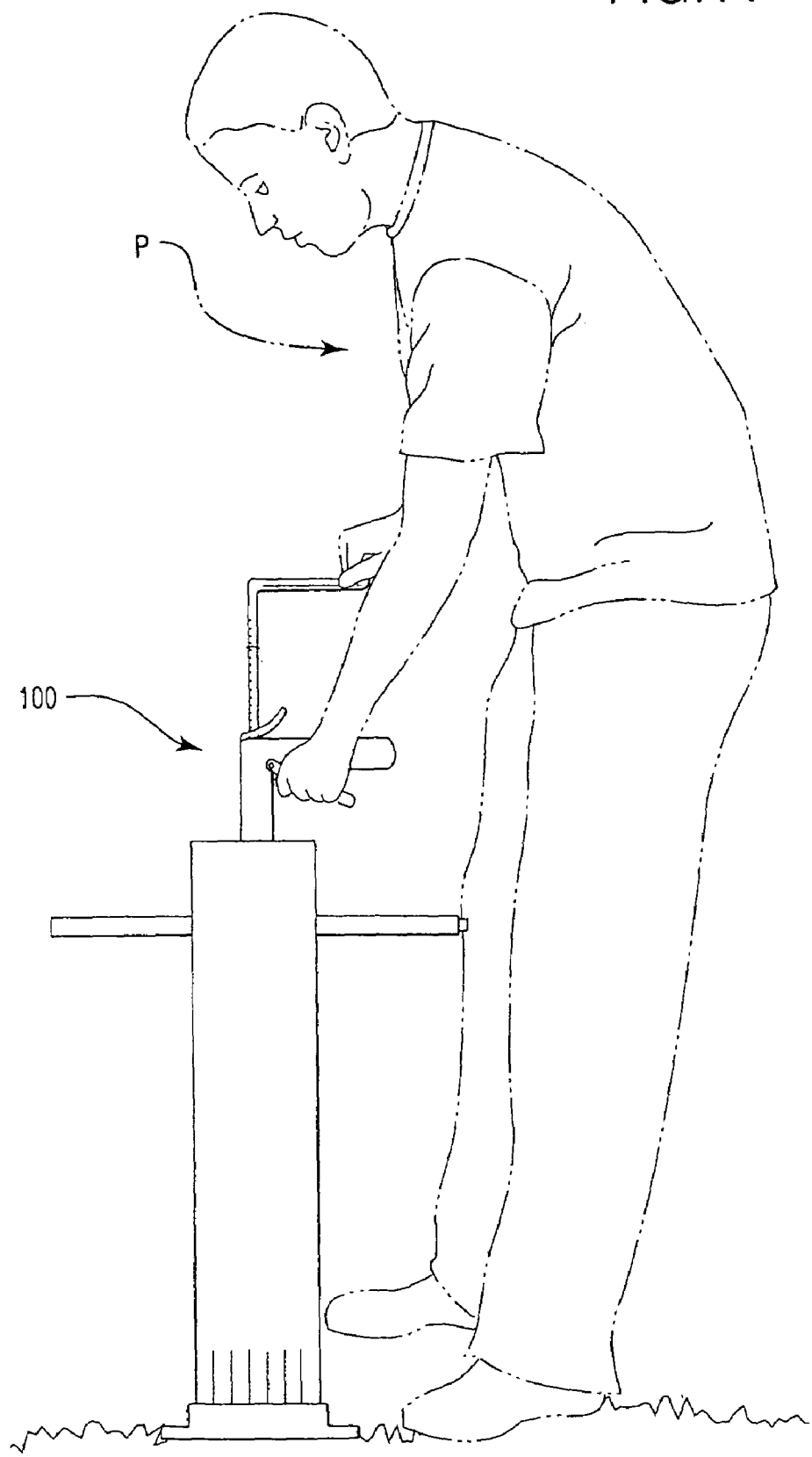
FIG. 11 shows a person using the sod saver tool, in accordance with the principles of the present invention.

FIG. 11 shows a person using the sod saver tool, in accordance with the principles of the present invention. The FIG. 11 depicts a person P manipulating rod 60 and lever 10 in order to set the digging level of the sod saver tool 100.

FIG. 2A shows a bottom view of some of the components of the sod saver tool, in accordance with the principles of the present invention. FIG. 2B shows a side view of the fingers of the sod saver tool, in accordance with the principles of the present invention.

FIG. 2A depicts a bottom view of fingers 42, including an outer side 42a of a finger 42 and an inner side 42b of a finger 42. The outer side 42a of a finger 42 corresponds to the exterior of the cylinder-shaped body 40. The inner side 42b of a finger 42 corresponds to the interior of the cylinder-shaped body 40.

FIG. 2A shows fingers 42 in their resting position. Fingers 42 are formed to be able to flex radially outward in direction "D", and to resiliently return to their resting position.

FIG. 2B depicts a side view of a plurality of fingers 42. FIG. 2B depicts a side view of the sod saver tool 100 with fingers 42, including an outer side 42a of some fingers 42 and an inner side 42b of some fingers 42. The outer side 42a of fingers 42 corresponds to the exterior of the cylinder-shaped body 40. The inner side 42b of fingers 42 corresponds to the interior of the cylinder-shaped body 40.

FIG. 2B includes an outer side 44a of the tip 44a finger 42 and an inner side 44b of a tip 44 of a finger 42. The outer side 44a of tip 44 corresponds to the exterior of the cylinder-shaped body 40. The inner side 44b of tip 44 corresponds to the interior of the cylinder-shaped body 40. Each finger 42 has a tip 44.

FIG. 2B illustrates the fact that the present invention may be formed with different types of tips 44. FIG. 2B depicts three tips 44 with sharp ends, two tips 44 with flat ends, and two tips with jagged uneven ends. Other types of tips 44 are possible.

Figure 2C:
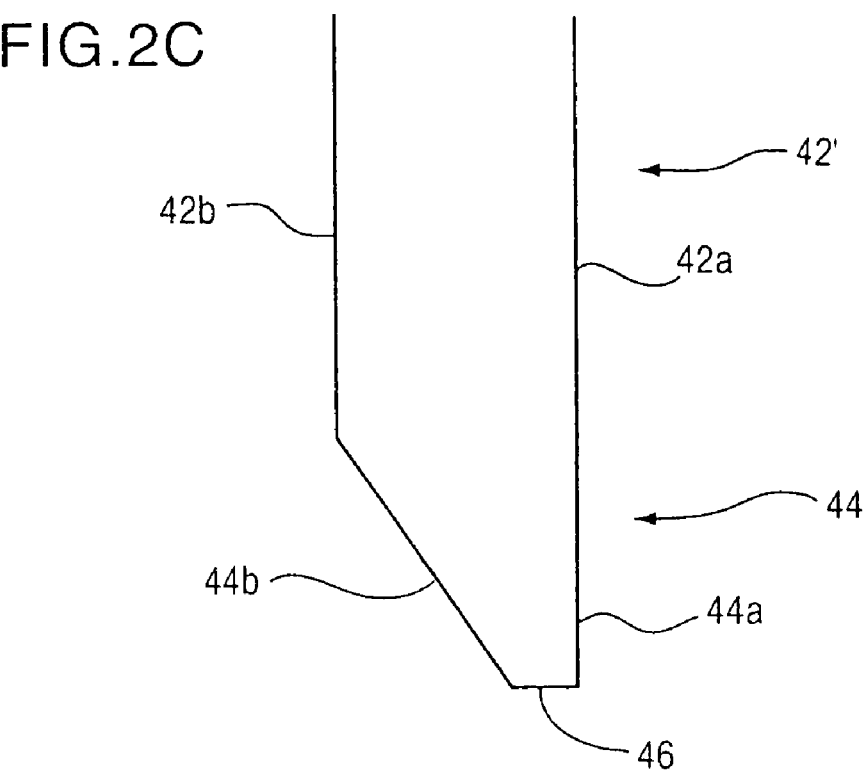
FIG. 2C shows a detailed side view of a first embodiment of one of the fingers of the sod saver tool, in accordance with the principles of the present invention.
Figure 2D:
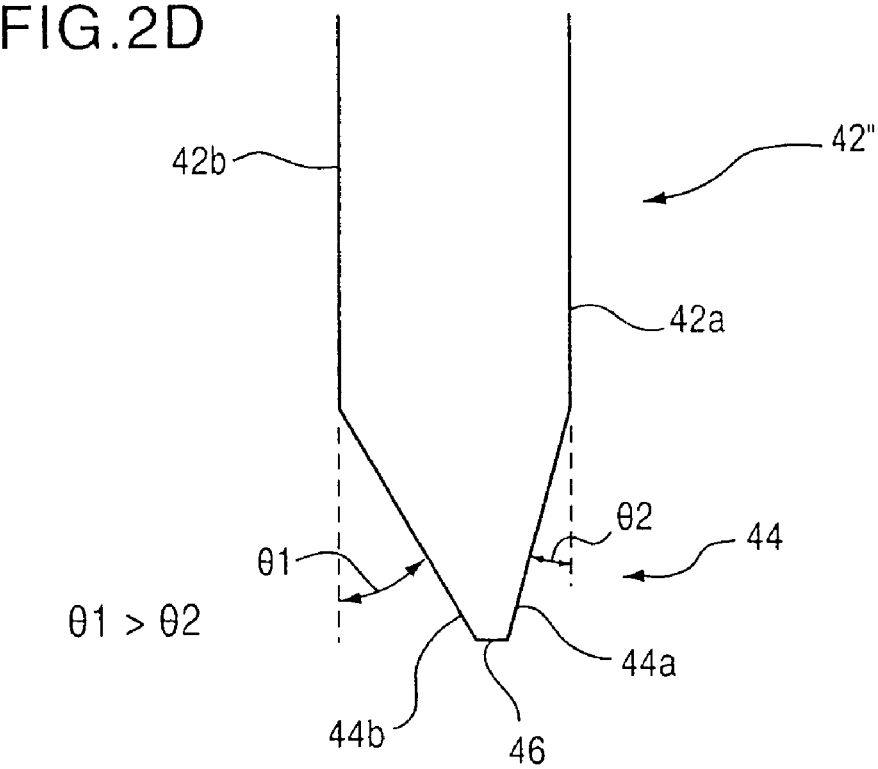
FIG. 2D shows a detailed side view of a second embodiment of one of the fingers of the sod saver tool, in accordance with the principles of the present invention.

FIG. 2C shows a detailed side view of a first embodiment of one of the fingers of the sod saver tool, in accordance with the principles of the present invention. FIG. 2D shows a detailed side view of a second embodiment of one of the fingers of the sod saver tool, in accordance with the principles of the present invention.

FIG. 2C depicts an enlarged, detailed side view of a finger 42', according to a first embodiment of the present invention. As shown in FIG. 2C, the inner side 44b of the tip 44 is beveled and the outer side 44a of tip 44 is not beveled. As a result, the outer side 44a of tip 44 together with the outer side 42a form a straight line, as shown in FIG. 2C. On the contrary, the inner side 44b of tip 44 is beveled, so that the inner side 44b does not form a straight line with the inner side 42b of finger 42', as shown in FIG. 2C. A flat end 46 is shown.

FIG. 2D depicts an enlarged, detailed side view of a finger 42", according to a second embodiment of the present invention. FIG. 2D depicts both sides 44a and 44b beveled, with the inner side 44b being beveled at a sharper angle than that of outer side 44a. As shown in FIG. 2D, a first angle $\theta 1$ is formed between side 44b and side 42b, and a second angle $\theta 2$ is formed between side 44a and side 42a. The first angle $\theta 1$ is greater than the second angle $\theta 2$. A flat end 46 is shown.

The fingers 42, 42', and 42" include non-metallic material, and are formed to have the capability to resiliently flex outward in direction "D". FIGS. 1 and 2A show fingers 42 in a resting position, when they are not flexing outward in direction "D". One or more fingers 42 may be pushed radially outward in direction "D" and may flex outward in direction "D". After the fingers 42 flex outward in direction "D", as shown in FIG. 2B, the fingers 42 can then automatically return back to the resting position shown in FIGS. 1 and 2A.

The sod saver tool 100 is generally used after a metallic object 260 is detected with a metal detector (not shown). For example, if a small metal object 260 is detected to be in the ground 230, the sod saver tool 100 is utilized to dig a cylinder-shaped hole 250 in the ground 230 and then carefully remove a cylinder-shaped plug 238 of soil from the hole 250. The small metal object 260 will be contained within the plug 238 of soil.

In accordance with the principles of the present invention, the sod saver tool of the present invention includes a plurality of resilient fingers 42 that can flex when digging the cylinder-shaped hole 250 in the ground 230. The resilient fingers 42 provide multiple advantages, including the advantages described below.

The fingers 42 of the sod saver tool include a non-metallic material which helps to prevent the buried object 260 from being scratched or damaged if the fingers 42 inadvertently come into contact with the buried object 260. The non-metallic material selected to be included in the fingers 42 is a material that is not likely to scratch or damage the buried object 260 if it ever comes into contact with the buried object 260.

When a person inadvertently directs a metal detector toward a large solid metal object, such as a metal shovel, that person may experience discomfort due to the loud noise produced by the metal detector. In accordance with the principles of the present invention, the non-metallic material selected to be included in the fingers 42 helps to prevent such loud noise and discomfort. Even if the metal detector is directed inadvertently toward the fingers 42 of the sod saver tool, the metal detector should not produce loud noise, because the fingers 42 include non-metallic material.

The fact that the fingers 42 of the sod saver tool can resiliently flex is beneficial because this helps to avoid a direct impact with the buried object 260 which could damage the buried object 260. When the fingers 42 of the sod saver tool come into contact with a rigid, solid object, the fingers 42 can flex outward, away from the object. Thus, damage to the buried object 260 can be avoided.

The fact that the fingers 42 of the sod saver tool can resiliently flex is also beneficial because this helps to guide soil up into the body 40 of the sod saver tool 100. Additionally, the resilient flexing of the fingers 42 helps to hold the cylinder-shaped plug 238 of soil in the body 40 of the sod saver tool when the sod saver tool is pulled up out of the hole 250.

Figure 3A:
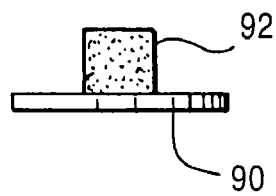
FIG. 3A shows a side view of a cover, in accordance with the principles of the present invention.
Figure 3B:
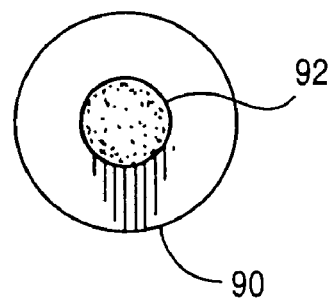
FIG. 3B shows a bottom view of the cover, in accordance with the principles of the present invention.

FIG. 3A shows a side view of a cover, in accordance with the principles of the present invention. FIG. 3B shows a bottom view of the cover, in accordance with the principles of the present invention. As shown in FIGS. 1, 3A, and 3B, the cover 90 has a magnet 92. FIG. 1 shows that the cutting tool 80 has a magnet 94. FIG. 1 also shows cover 90 held in position at the cutting tool 80 due to the magnetic force between magnet 92 and magnet 94. The outer diameter of the cover 90 is smaller than the inner diameter of the body 40, and thus, when the cover 90 is held to the cutting tool 80, the cover 90 can be moved up and down inside the body 40 according to the movements of the rod 60.

When the cover 90 is removed from the cutting tool 80, the cover 90 can be conveniently held on the exterior of the sod saver tool 100 because of magnet 54. The magnet 54 is located on the end of grip 50. The cover 90 can be held to the magnet 54 by magnetic force, while the cutting tool is used to cut a root 240 or other obstacle. This helps to prevent the cover 90 from being lost.

Figure 4:
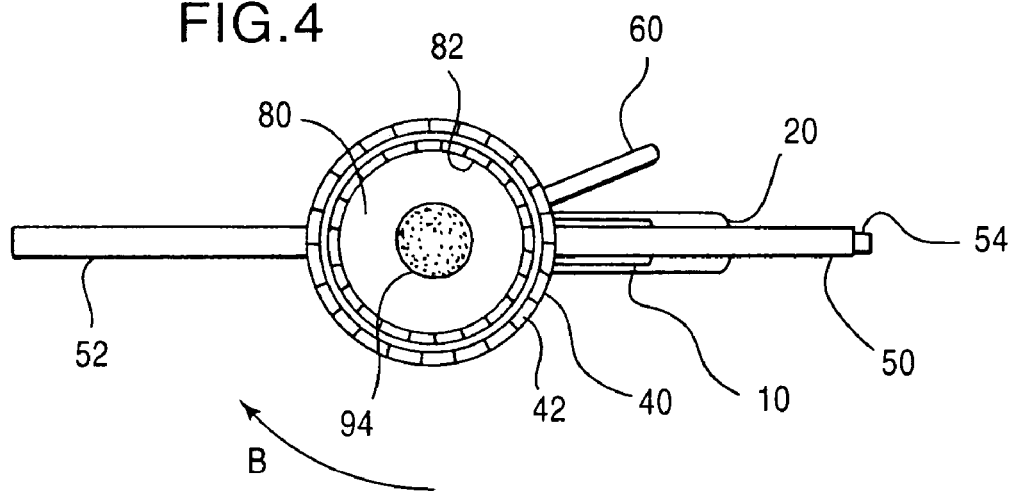
FIG. 4 shows a bottom view of the sod saver tool, in accordance with the principles of the present invention.
Figure 5:
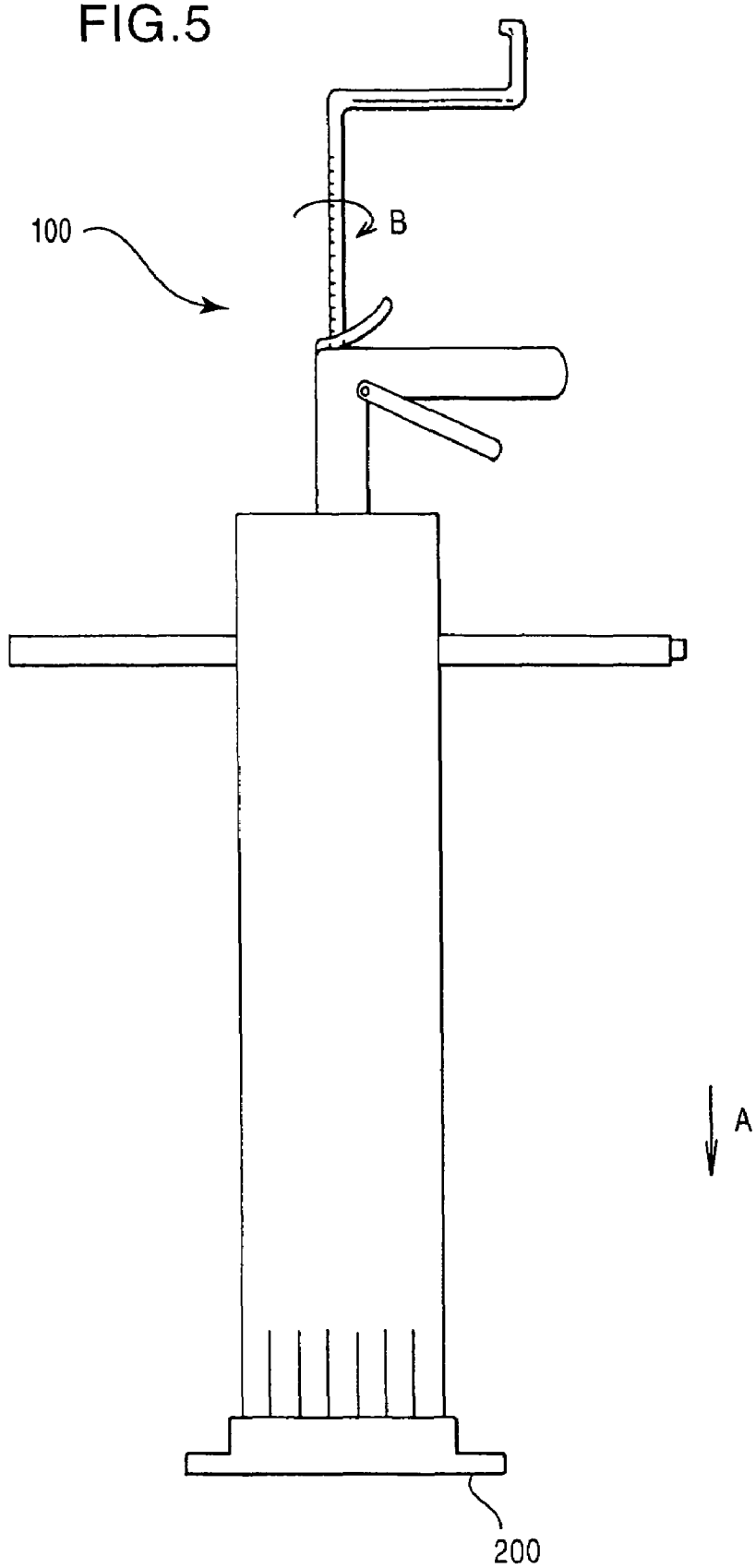
FIG. 5 shows a side view of the sod saver tool with a protector mounted to cover and protect the tips of the fingers, in accordance with the principles of the present invention.

FIG. 4 shows a bottom view of the sod saver tool, in accordance with the principles of the present invention. FIG. 5 shows a side view of the sod saver tool with a protector mounted to cover and protect the tips of the fingers, in accordance with the principles of the present invention.

After the protector 200 is mounted to cover tips 44, as shown in FIG. 5, the protector helps prevent tips from being damaged when the sod saver tool 100 is not in use. The protector 200 shown in FIG. 5 covers all of the tips 44, but does not cover the entire length of the fingers 42. However, in accordance with the principles of the present invention, the size of the protector 200 can be modified prior to manufacture, so that the protector 200 will cover and protect the entire length of the fingers 42.

The protector 200 is held to the sod saver tool 100 because the inner diameter of the protector 200 is slightly less than the outer diameter of fingers 42 when the fingers 42 are at their resting position. The protector 200 is formed to snugly fit over the fingers 42. In particular, the protector 200 is pushed onto fingers 42 using force, and the fingers 42 are thus compressed inward slightly. The fingers 42 are formed such that they are always trying to go to their resting position. Thus, when the fingers 42 are compressed by protector 200, the fingers 42 will try to push outward to go back to their resting position. As a result, the protector 200 will be held in position due to the snug fit. The protector 200 can be removed from fingers 42 using force.

If desired, the protector 200 can be held extremely firmly to the fingers 42 using the following method. When the protector 200 is placed on the fingers 42, the fingers 42 are then compressed such that the inner diameter of the fingers 42 is slightly smaller than the outer diameter of the cover 90. After the protector 200 is placed on the fingers 42, the rod 60 can be pushed in direction "A" to move the cutting tool 80 and cover 90 toward the fingers 42. Once the cover 90 reaches the fingers 42, the cover 90 pushes the fingers 42 outward toward the protector 200. This causes the protector 200 to be held in place very tightly.

To remove the protector 200 from the fingers 42, the rod 60 can be pulled outward from body 40, in the direction opposite to direction "A", so that the cutting tool 80 and cover 90 are retracted further up toward wall 41. This stops the fingers 42 from being flexed outwardly, and thus allows protector 200 to be removed.

Figure 6A:
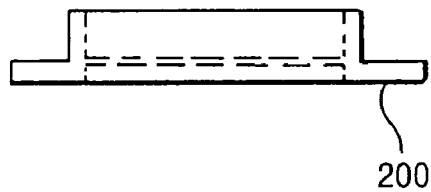
FIG. 6A shows a side view of the protector, in accordance with the principles of the present invention.
Figure 6B:
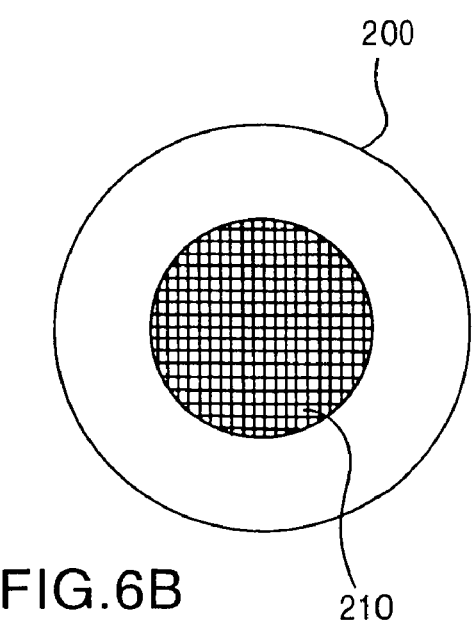
FIG. 6B shows a bottom view of the protector, in accordance with the principles of the present invention.

FIG. 6A shows a side view of the protector, in accordance with the principles of the present invention. FIG. 6B shows a bottom view of the protector, in accordance with the principles of the present invention.

The protector 200 is a tool that has two purposes. The first purpose of the protector 200 is to protect tips 44, as described above with reference to FIG. 5. The second purpose of the protector 200 is to use a screen 210 to screen soil or filter soil. This second purpose of the protector 200 shall be described below.

The protector 200 has at least one screen 210, as shown in FIG. 6B. The screen 210 can also be referred to as a filter 210. Multiple screens 210 can be installed in the protector 200. If all screens installed in the protector 200 have the same size holes, then this provides some advantages. When all screens 210 are similarly aligned, the apertures will be all aligned and the apertures will be at their full size. However, if one or more of the screens 210 are rotated slightly so that they are not all aligned with each other, then the apertures will be partially blocked, with the end result being that the user has a convenient way to control the size of the apertures. If the user wants the largest apertures possible when filtering soil, all screens in protector 210 can be aligned with each other. If the user wants the apertures to be smaller than that, and wants to use the same screens, the user merely has to rotate at least one screen in protector 200 so that apertures of one screen will be partially blocked by other screens.

Figure 7:
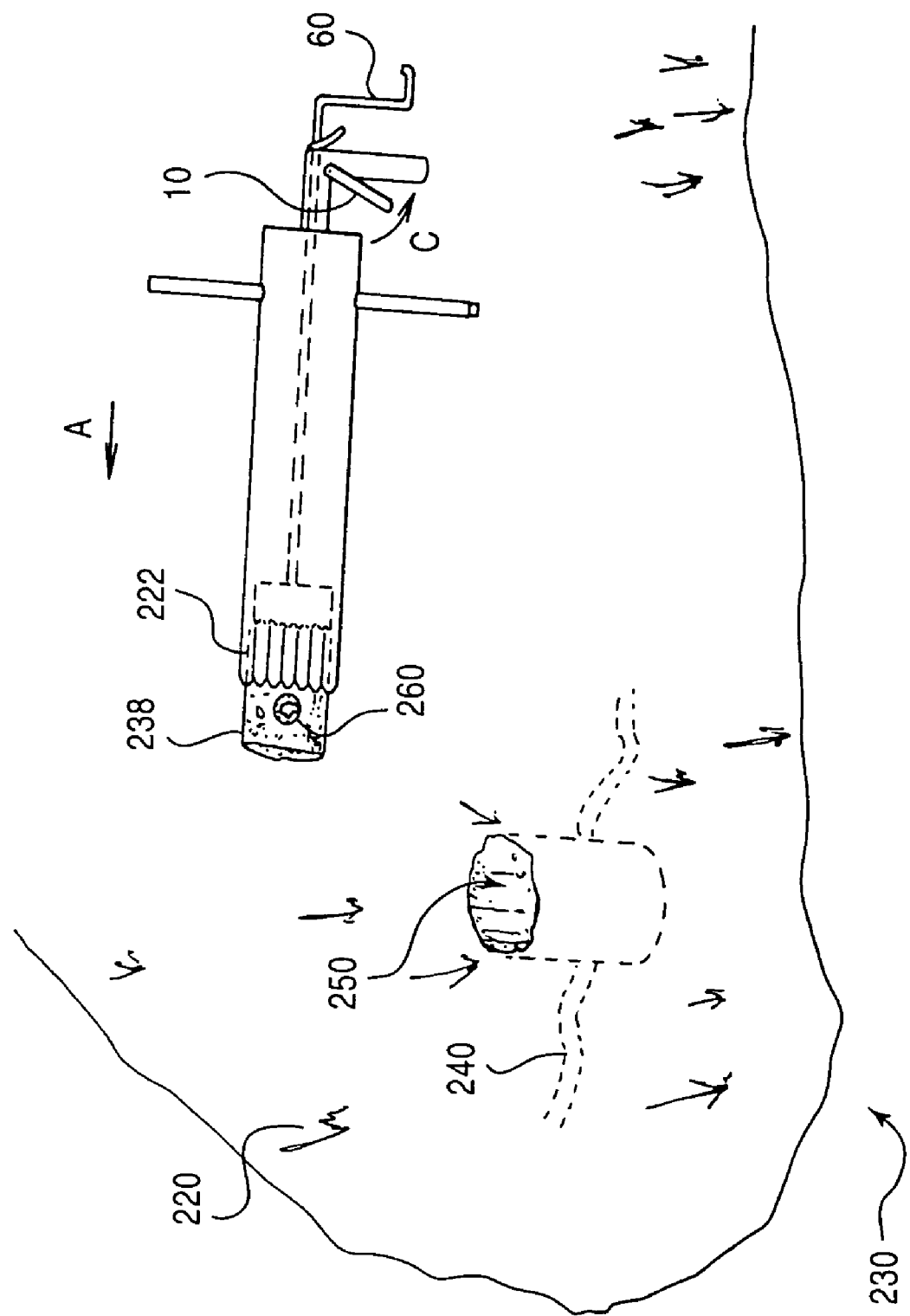
FIG. 7 shows a general view of the sod saver tool after being used, and shows the surrounding environment, in accordance with the principles of the present invention.

The second purpose of the protector 200, to use the screen 210 to filter the soil 238, is described in more detail during the following discussion of FIGS. 6B and 7.

FIG. 7 shows a general view of the sod saver tool after being used, and shows the surrounding environment, in accordance with the principles of the present invention. FIG. 7 shows ground 230, grass-covered surface layer 220 of ground 230, a tree root 240 in the ground 230, a cylinder-shaped hole 250 formed by sod saver tool 100, plug 238 of soil held by sod saver tool 100, grass-covered surface layer 222 of plug 238, and coin 260 in plug 238.

A person uses the sod saver tool 100 to dig down to the set digging level, and then pulls the sod saver tool 100 up out of the ground using grips 50 and 52. At this time, a cylindrical plug 238 of soil is being held within body 40 of tool 100, as shown in FIG. 7. The coin 260 is somewhere inside the plug 238 of soil held by the tool 100.

The protector 200 is then positioned over the hole 250 formed in the ground 230 (this positioning of the protector 200 is not shown). The protector 200 is arranged so that, when large lumps of soil are placed on screen 210, the large lumps of soil will be held by the screen 210 because the large lumps are larger than the apertures in screen 210 (FIG. 6B). Also, when small pieces of soil are placed on screen 210, the small pieces of soil will fall through the screen 210 and into the hole 250 because the small pieces are smaller than the apertures in screen 210.

The body 40 of the sod saver tool 100 is placed horizontally on the ground, as shown in FIG. 7. The user will pull lever 10 toward handle 20 in direction "C", in order to incrementally advance rod 60 toward fingers 42. This will cause cover 90 to push a portion of plug 238 of soil out from body 40 and onto screen 210.

The user will then cut a portion of the exposed plug 238 of soil using scraping tool 270. FIG. 9A shows the scraping tool, in accordance with the principles of the present invention. FIG. 9B shows a replacement blade for the scraping tool, in accordance with the principles of the present invention. FIG. 9A depicts scraping tool 270, and FIG. 9B depicts a replacement blade 272b for the tool 270.

When the soil has an appropriate moisture content, the user can utilize tool 270 to cut off a slice of soil from the plug 238 in the same way a slice of bread is cut from a loaf of bread. The slice of the soil from the plug 238 can be laid down on the screen 210. If the soil is very dry, then soil will crumble onto the screen 210.

When some soil is on the screen 210, then the scraping tool 270 can be used to poke around the soil and inspect it, to try to find the object 260. During this process, the slice of soil is broken down into small pieces of soil. The screen 210 is sized to retain the object 260 while allowing small pieces of soil to pass through down to the hole 250.

The scraping tool is formed to include a non-metallic material so that the buried object 260 will not be scratched or damaged if the scraping tool comes into contact with the object 260.

Also, in addition to the scraping tool 270, a metal detector can be utilized to inspect the slice of soil on the screen 210. Thus, it is an advantage of the present invention to form the protector 200, the screen 210, the scraping tool 270, and the fingers 42 from a non-metallic material. In this way, because none of those components include metallic materials, in accordance with the principles of the present invention, the user can conveniently inspect the slice of the soil with a metal detector in a relaxed manner.

If any of those components (200, 210, 270, 42) did include metallic materials, the user could suffer from painfully loud noises output from the metal detector should the metal detector be inadvertently directed toward any of those metal-containing components while inspecting the slice of soil on the screen 210. Thus, in accordance with the principles of the present invention, the components 200, 210, 270, 44, and 42 do not include any materials that may be detected by a metal detector.

FIG. 8 shows a side view of a cylinder-shaped plug of soil after it has been removed from the ground, in accordance with the principles of the present invention. FIG. 8 depicts a portion 242 of a tree root included in the plug 238. The cutting tool 80 is used to cut through roots such as the tree root 240 shown in FIG. 7.

The present invention provides a scraping tool 270 for cutting or scraping some soil away from the cylinder-shaped plug 238 of soil, and for scraping soil away from a small metal object 260, in accordance with the principles of the present invention. Thus, after the sod saver tool 100 is utilized to remove the plug 238 of soil from the hole 250, the scraping tool 270 is utilized to help a person to carefully analyze the contents of the plug 238 of soil, so that the small metal object 260 can be located and acquired. The scraping tool 270 is formed from materials including non-metallic materials.

FIGS. 9A and 9B depict a non-metallic scraping tool 270, first non-metallic blade 272a, second non-metallic blade 272b, non-metallic handle 274 for tool 270, fastener 276 holding handle 274 to a blade, and hole 278 in handle 274. The hole 278 receives the fastener 276 to hold the blade to the handle. The second non-metallic blade 272b is a replacement blade that can be conveniently attached to handle 274 for use when the first blade 272a becomes damaged. All components shown in FIGS. 9A and 9B are lightweight and non-metallic. The handle 274 includes two halves which are formed to fit together and hold a blade 272a. Each half of handle 274 is similar in size and shape to the other half. To assemble scraping tool 270, the blade 272a is placed between the two halves of handle 274, and then the fasteners 276 are inserted into holes 278 to securely hold the blade 272a between the two halves of the handle 274.

In accordance with the principles of the present invention, the present invention provides convenient and elegant methods for retrieving buried treasure without damaging the buried treasure.

Figure 10B:
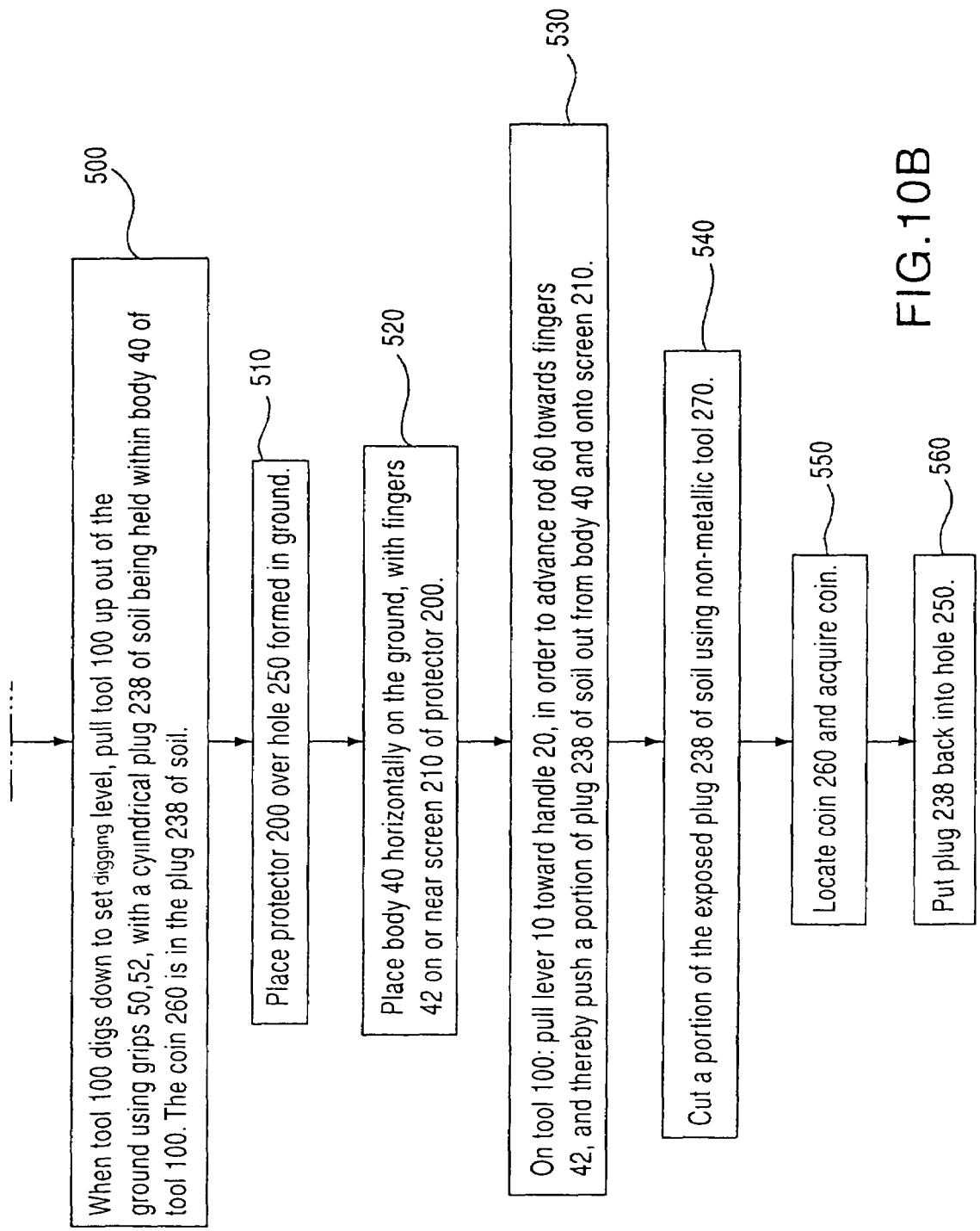

FIGS. 10A–10B show a flowchart illustrating a method of using the sod saver tool and the scraping tool, in accordance with the principles of the present invention.

At step 400, as shown in FIG. 10A, locate a region of soil 230 which contains a buried metallic object such as a coin 260. At step 410, detect the depth level of the buried coin 260. A metal detector may be used to locate the region of soil at step 400 and to detect the depth level at step 410.

At step 420, position scraping tool 270 on the ground to point to and specifically identify the region of soil 230 containing the buried coin 260. At step 430, use rod 60 to set digging level of sod saver tool 100 according to the detected depth level. The digging level should be set to be two inches deeper than the detected depth level of the buried coin 260. Thus, if the buried object is detected to be 14 inches below the surface 222 of the soil 230, then the digging level should be set to be 16 inches, so that the object 260 will be included in the plug 238 of soil.

At step 440, place sod saver tool 100 over the soil which contains the buried coin 260, so that the fingers 42 encircle the region containing the buried coin 260. Here, the body 40 of the sod saver tool 100 should be arranged to be perpendicular to the ground, basically in the orientation shown in FIG. 11.

At step 450, push down on the grips 50 and 52, and twist the sod saver tool 100, so that fingers 42 dig down into the soil. Here, the grips 50 and 52 are pushed downward in direction "A", and the sod saver tool 100 is twisted in direction "B". Direction "A" is indicated in FIGS. 1 and 5, for example. Direction "B" is indicated in FIGS. 4 and 5.

At step 460, a determination is made as to whether an obstacle is encountered. For example, a thick tree root 240 may be encountered by the fingers 42. If an obstacle is encountered, proceed to step 470. If an obstacle is not encountered, proceed to step 500.

The fingers 42 might not be able to cut through the thick tree root 240. Other obstacles that may be encountered include rocks, for example. The sod saver tool 100 includes a retractable cutting tool 80 located within the interior of body 40, as shown in FIG. 1. The cutting tool 80 is capable of cutting the tree root 240. The cutting tool 80 may be formed from a metallic material or a non-metallic material or both. The cutting tool 80 has sharp, rigid teeth 82. The cutting tool 80 does not have resilient fingers that flex in the manner of fingers 42.

At step 470, when an obstacle such as a root is encountered, pull the sod saver tool 100 up from the hole 250, and then remove the cover 90 from the cutting tool 80. When the cover 90 is removed, the teeth 82 are exposed. At this time, the cutting tool 80 is still retracted inside the body 40. It is not in a position to be able to cut the root.

The cutting tool 80 must be extended downward in direction "A" toward the fingers 42. The cutting tool 80 is attached to the rod 60. To extend the cutting tool 80 down toward the fingers 42, the rod 60 must be pushed in direction "A". When the teeth 82 are located slightly below the tips 44, the cutting tool 80 is in the correct position to be able to cut through the root 240.

At step 480, rotate rod 60 in direction "B" to rotate the cutting tool 80, in order to cut the root 420. Direction "B" is indicated in FIGS. 4 and 5. The rod 60 is formed to have a handle or bend at an upper end thereof, as shown in FIGS. 1, 5, and 7. This handle or bend at the upper end of rod 60 which facilitates the rotating of the rod 60.

In this manner, the cutting tool 80 will cut through the root 240, and a portion 242 of root 240 will eventually end up inside the plug 238 of soil, as shown in FIG. 8.

At step 490, when the cutting tool 80 has cut through the root 240, replace the cover 90 onto the cutting tool 80, and then use rod 60 to reset the digging level of the sod saver tool 100 according to the originally detected depth level of the buried coin 260'. When resetting the digging level of the sod saver tool 100, the cutting tool 80 will be automatically retracted back into body 40 and away from fingers 42 because the cutting tool 80 is attached to rod 60.

Steps 440–450 may be repeated as needed to get down to the set digging level. At step 500, when the sod saver tool 100 digs down to the set digging level, pull the sod saver tool 100 up out of the hole 250 which was formed in the ground. When the sod saver tool 100 gets down to, or arrives at, the set digging level, the cover 90 will come into contact with the grass surface 222.

Use handles 50 and 52 to pull the sod saver tool 100 up. At this time, a cylindrical plug 238 of soil will be held within body 40 of the sod saver tool 100. If the moisture level of the soil is appropriate, the plug 238 will stick to the interior of body 40. Also, the fingers 42 help to hold the plug 238 in the body 40. The coin 260 will be in the plug 238 of soil, as shown in FIGS. 7 and 8.

At step 510, place protector 200 over the hole 250 formed in ground, so that the screen 210 covers the hole 250. At step 520, place body 40 of sod saver tool 100 horizontally on the ground, with the fingers 42 close to screen 210.

At step 530, pull lever 10 toward handle 20, in order to incrementally advance rod 60 toward fingers 42, and thereby push a portion of plug 238 of soil out from body 40 and onto screen 210. When the moisture level of the soil is appropriate, no portion of plug 238 will fall from body 40, even when plug 238 is partially extending out from body 40 as shown in FIG. 7. When this happens, the scraping tool 270 can be used to cut a slice of plug 238 away from body 40. At step 540, cut a portion of the exposed plug 238 of soil using non-metallic scraping tool 270.

The soil on the screen 210 might contain the coin 260, or the coin 260 might still be in the soil that is held in body 40. If the coin is not in the soil on the screen 210, then the soil on the screen should be either pushed through screen 210 into the hole 250 or just dumped into the hole 250 by turning over the protector 200.

When there is no soil on the screen 210, steps 530 and 540 can be repeated to get more soil from body 40 onto screen 210. Repeat steps as needed.

By following the above steps, eventually the buried object 260 will be found in the soil on the screen 210. At step 550, locate coin 260 and acquire coin. At step 560, put the entire plug 238 back into hole 250. This can be done by moving protector 200 away from hole 250, arranging the sod saver tool 100 with fingers 42 over hole 250, and then pulling lever 10 toward handle 20 in order to advance rod 60. This will push the remaining soil from body 40 into hole 250.

The fingers 42 include a non-metallic material that can dig through soil 230 without damaging coins or other buried treasure located in the soil.

In accordance with the principles of the present invention, the scraping tool 270 of the present invention includes a non-metallic material that can dig through soil without damaging coins or other buried treasure located in the soil. The non-metallic material of the scraping tool 270 is also advantageous because it helps prevent loud noises and discomfort if a metal detector is inadvertently directed toward the scraping tool 270.

The non-metallic material of the fingers 42 is advantageous because it helps prevent loud noises and discomfort if a metal detector is inadvertently directed toward the fingers 42 of the sod saver tool.

The sod saver tool 100 has a plurality of fingers 42 that can resiliently flex when digging the cylinder-shaped hole 250 in the ground. The fingers 42 include a non-metallic material that can dig through soil without damaging coins or other buried treasure located in the soil.

The present invention provides convenient and elegant methods for retrieving a buried treasure without damaging the treasure.

The tools and methods of the present invention may be utilized to retrieve items from soil located beneath surfaces covered by grass and surfaces covered by other types of vegetation.

The tools and methods of the present invention may be utilized to retrieve items from soil located beneath surfaces covered by grass and surfaces covered by other types of vegetation, without seriously damaging the grass or other vegetation at the surface.

The tools and methods of the present invention may be utilized to retrieve items from soil in the vicinity of tree roots, rocks, and other tough materials and obstacles.

The present invention provides a sod saver tool 100 for digging to acquire a coin 260 or other treasure buried in the ground 230, the coin or other treasure being located by a metal detector. The sod saver tool 100 can also be referred to as a digging tool.

The sod saver tool 100 includes a main cylindrical body 40 which has a digging portion at a bottom region of the main cylindrical body 40. The fingers 42 and tips 44 correspond to a digging portion at the bottom region of body 40. The body is rotated in direction "B" to dig into the ground. The present invention also provides an inner plunger slidably received telescopically up within the main cylindrical body 40 and away from the bottom region of the main cylindrical body. The inner plunger corresponds to the cutting tool 80, which is attached to a portion of the rod 60 which is inside body 40. The plunger or cutting tool 80 can telescope down away from wall 41 toward the bottom region or fingers 42 of body 40, in direction "A". Also, the plunger or cutting tool 80 can telescope toward wall 41 away from the bottom region or fingers 42 of body 40.

The plunger or cutting tool 80 has a lower end provided with cutting teeth 82. When an underground obstacle, such as root 240, is encountered in the soil, the plunger is slidably advanced within the main cylindrical body until the cutting teeth extend beyond the bottom region or fingers 42 of the main cylindrical body to cut the underground object, and the inner plunger is rotated about its longitudinal axis, in direction "B", to cut through the underground object.

The cover 90, which may also be referred to as a removable cap, covers the cutting teeth 82 on the plunger or cutting tool 80 during normal use of the sod saver tool 100. The removable cap is removed from the plunger prior to cutting through an underground obstacle. The underground obstacle can be an underground root 240 or a rock, for example. The cutting tool 80 and teeth 82 can be formed to be very sharp, so that rocks and other objects can be cut or broken, in accordance with the principles of the present invention. Even if a particular rock cannot be cut or broken by the cutting tool 80, the cutting tool 80 may be able to move or dislodge the particular rock so that the plug 238 of soil can be successfully taken out from the ground.

When the plunger or cutting tool 80 is used to cut a root or other object, the rod 60 is rotated in direction "B" and the rod 60 is also pushed down in direction "A".

In accordance with the principles of the present invention, a digging means is formed at the bottom region of body 40. The digging means can include the resilient fingers 42 formed at the bottom region of the body 40 of the sod saver tool 100.

In accordance with the principles of the present invention, a cutting means is slidably positioned at the interior of body 40.

The cutting means can include the cutting tool 80. The cutting means is telescopically received within the main cylindrical body 40, and is selectively advanced by a user beyond the main cylindrical body 40 to cut an obstacle such as a root encountered by the digging means of the main cylindrical body 40.

The resilient fingers 42 will tend to deflect away from any large solid object encountered in the soil. Thus, the fingers 42 will deflect away from a buried coin 260 to avoid damaging the coin 260. Also, the fingers 42 will deflect away from a root 240. It is recommended that, when any large solid object is encountered underground by the fingers 42, the object should be visually inspected before utilizing the cutting tool 80. The cutting tool 80 would severely scratch and damage a buried coin 260. Thus, it is best to use cover 90 to cover the teeth 82 to help prevent inadvertent contact between teeth 82 and coin 260.

The present invention provides a combination of tools for digging out a buried coin 260 or other treasure located by a metal detector. The combination of tools includes a main cylindrical body 40 being rotated about its longitudinal axis to dig a substantially cylindrical plug 238 of soil out from the earth, with the buried coin 260 or other treasure being contained in the plug of soil, and includes a scraping tool 270 for sequentially slicing off successive axial portions or slices of the plug of soil, facilitating a determination by a metal detector as to which axial portion of the plug contains the buried coin or other treasure.

The scraping tool includes non-metallic material. Furthermore, the non-metallic material includes a relatively high-impact plastic material. Also, the scraping tool may be molded of the relatively high-impact plastic material. The scraping tool can be formed to be substantially smooth so as to avoid damaging the buried coin or other treasure.

The scraping tool 270 can be formed to have no metallic material, so that even a very sensitive metal detector will not detect the presence of the scraping tool 270. This facilitates convenient examination of the soil on the screen 210. A person can hold the scraping tool 270 in one hand and poke at the soil on the screen 210, while simultaneously the other hand holds a small, sensitive metal detector which is constantly scanning the soil located on the screen 210.

After the rod 60 is set to digging level X as shown in FIG. 1, the rod can be said to be set in a first position. If a root 240 is encountered by fingers 42, the cover 90 must be removed, and the rod 60 must be pushed in direction "A" to make the teeth 82 of the cutting tool 80 contact the root 240. Thus, the teeth 82 must extend to the tips 44 or beyond the tips 44. When the teeth 82 contact the root 240 and cut the root 240, the rod 60 can be said to be in a second position. After the root 240 is cut, then the rod 60 can be moved back to the first position, which corresponds to the original digging level X. Then the cover 90 is placed back on the cutting tool 80, and then digging with the fingers 42 can resume.

The cover 90 is recommended, but the cover 90 is not required. If the cover 90 is not desired, the present invention will still function properly. The cover 90 provides some extra protection to help avoid scratching the finish of a buried coin. When the cover 90 is used, this helps to ensure that the teeth 82 are not exposed and to ensure that the teeth 82 will not come into contact with any buried treasure.

While the invention has been described in conjunction with various embodiments, they are illustrative only. Accordingly, many alternative, modifications and variations will be apparent to persons skilled in the art in light of the foregoing detailed description. The foregoing description illustrates some alternatives and variations falling with the spirit and broad scope of the appended claims. While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit and scope of the applicant's general inventive concept.

What is claimed is:

1. A method of digging a hole in soil to acquire an object without damaging the object, the method comprising:

setting a digging level of a hand-held digging tool according to a detected amount of the soil covering the object, the setting being performed by sliding a rod through a main body of the digging tool to a first position corresponding to the detected amount, wherein a cutting tool is secured to an end of the rod;

arranging the digging tool so that a plurality of fingers of the digging tool encircle a surface of the soil covering the object, the fingers being flexible and non-metallic;

pushing the digging tool down toward the soil, and rotating the digging tool around an axis substantially parallel to a body of the digging tool, wherein the fingers extend down toward the soil;

when the pushing and rotating are performed, digging the fingers through the surface of the soil;

when the fingers encounter an obstacle in the soil, arranging the digging tool so that the fingers encircle the soil covering the object, sliding the rod down through the main body of the digging tool toward the fingers to a second position to advance the cutting tool and place the cutting tool in contact with the obstacle, and rotating the rod around the axis substantially parallel to the body of the digging tool to operate the cutting tool to cut through the obstacle;

when the cutting tool cuts the obstacle, sliding the rod from the second position to the first position, and arranging the digging tool so that the fingers encircle the soil covering the object;

pushing the digging tool toward the soil, and rotating the digging tool around the axis substantially parallel to the body of the digging tool, until the cutting tool contacts the surface fo the soil;

when the cutting tool contacts the surface of the soil, which indicates that the digging has reached through the predetermined amount of the soil, lifting the digging tool up and automatically holding a quantity of the soil inside the digging tool, wherein the object is contained inside the held soil;

incrementally advancing the rod toward the fingers a predetermined distance to push a portion of the held soil out from the digging tool, the incremental advancing being performed by pulling a lever on the digging tool; and separating the soil from the object with a non-metallic scraping tool.

2. The method according to claim 1, further comprising:

removing a cover from the cutting tool when the fingers encounter the obstacle in the soil; and placing the cover back on the cutting tool after the cutting tool cuts the obstacle, so that the cover is disposed between the soil and the cutting tool.

3. The method according to claim 2, wherein the cover is held to the cutting tool on the interior of the body of the digging tool by a magnetic force, and the cover is held to the digging tool on an exterior of the body by a magnetic force.

4. The method according to claim 1, further comprising:

after the digging tool is lifted up with the quantity of soil held inside the digging tool, placing a protector over a hole formed in the soil by the digging tool, wherein the protector has a screen, the screen being formed to allow small pieces of soil to fall through the screen into the hole and to prevent large pieces of soil from falling through the screen into the hole;

when the rod is incrementally advanced toward the fingers a predetermined distance to push a portion of the held soil out from the digging tool, positioning the digging tool so that the soil pushed out of the digging tool is directed to the screen of the protector, wherein the separating of the soil from the object with the non-metallic scraping tool is performed over the screen which is over the hole; and when the object is acquired from the soil, placing the soil back into the hole and placing the protector over the fingers of the digging tool to protect the fingers.

5. A hand-held digging tool for digging a hole in soil to acquire an object without damaging the object, the digging tool comprising:

a body having a cylindrical shape, a hollow interior, an open front end, and a wall at a back end;

a plurality of fingers at the front end of the body, the fingers being formed of a non-metallic and flexible material, the fingers digging the hole in the soil when the body is pushed down toward the soil and is rotated around an axis of the body;

a rod slidably extending through the wall, the rod having a front and a back end on opposite sides of the wall, the back end of the rod being located outside the body, the back end of the rod having markings corresponding to predetermined digging depths; and a cutting tool having a cylindrical hollow shape, the cutting tool being secured to the front end of the rod, the cutting tool being retracted in the interior of the body when the fingers are digging the hole, wherein when the front end of the rod is pushed toward the open front end of the body to advance the cutting tool to contact soil or an obstacle at the open front end of the body, and the rod is rotated around the axis of the body, the cutting tool cuts through the soil or obstacle.

6. A hand-held digging tool for digging to acquire an object buried in the ground, the object being located by a metal detector, the tool comprising:

a main cylindrical body being rotated about its longitudinal axis for digging a substantially cylindrical plug of soil from the ground, the object being contained in the plug of soil, and a plurality of circumferentially-disposed resilient fingers being located at a bottom portion of the main cylindrical body, wherein when the digging of the plug is being performed, the resilient fingers tend to spread radially of the longitudinal axis of the main cylindrical body, being deflected away from directly hitting and scratching the buried object, tend to generally direct the soil upwardly into the main cylindrical body, and tend to cause the plug to be substantially-compacted and cylindrical, wherein the compacted plug may be easily reinserted into a hole in the ground, further comprising:

a rod disposed within the main cylindrical body, the rod having a first end connected to the cutting tool within the main cylindrical body and an opposite second end extending outwardly from the main cylindrical body and connected to a handle; and a plurality of markings on the rod externally of the main cylindrical body, the markings corresponding to predetermined digging depths.

7. The digging tool of claim 6, further comprising a lock unit connected to the rod to retain the rod at a desired digging depth.

* * * * *